Figure 1:
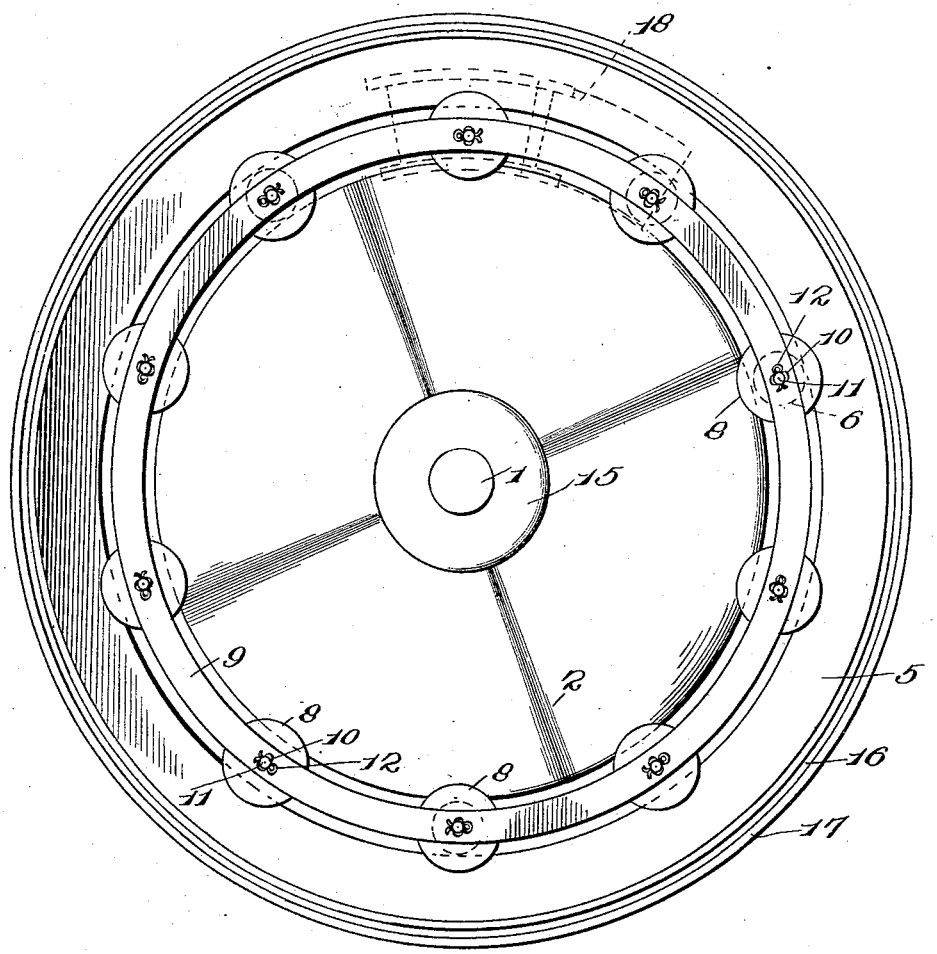

J. C. JACKSON.
WHEEL.
APPLICATION FILED MAY 12, 1908.

914,844.

Patented Mar. 9, 1909.
2 SHEETS—SHEET 1.

Witnesses

Inventor
J. C. Jackson
By ........., Attorneys

J. C. JACKSON.
WHEEL.
APPLICATION FILED MAY 12, 1908.
914,844.
Patented Mar. 9, 1909.
2 SHEETS—SHEET 2.
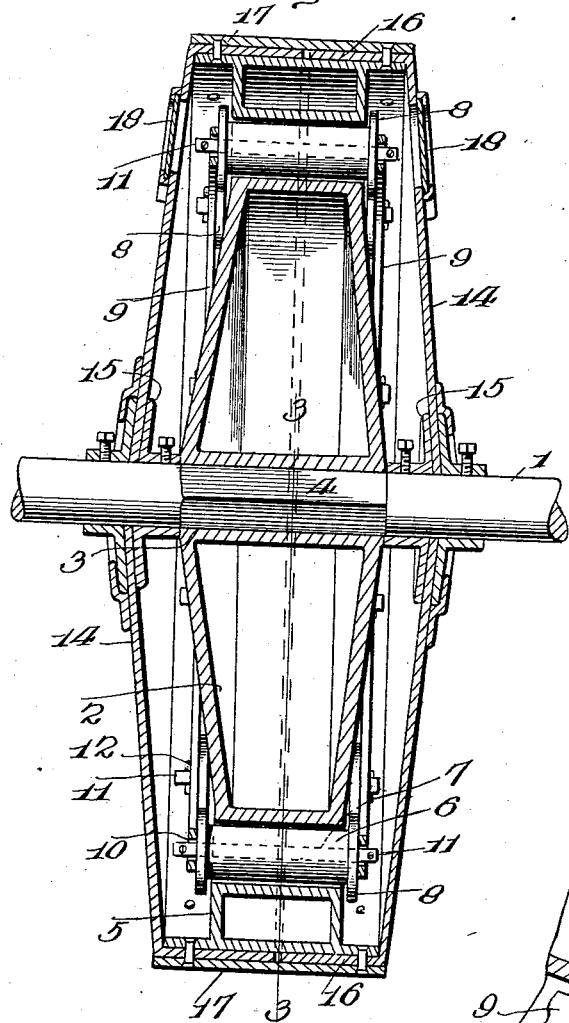
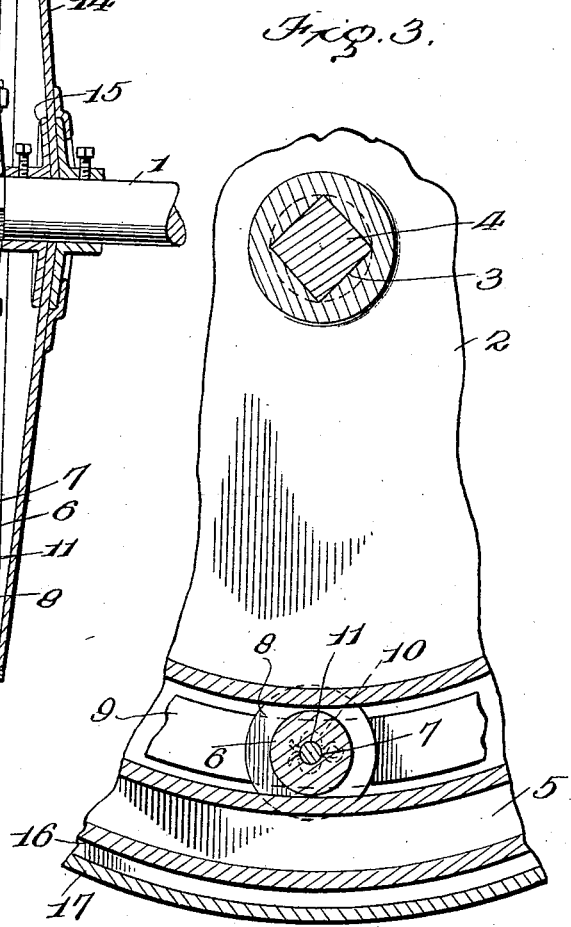
Witnesses
Inventor
J. C. Jackson
By
Attorneys

UNITED STATES PATENT OFFICE.

JOHN C. JACKSON, OF XENIA, OHIO.

WHEEL.

No. 914,844.  Specification of Letters Patent.  Patented March 9, 1909.

Application filed May 12, 1908. Serial No. 432,495.

*To all whom it may concern:*

Be it known that I, JOHN C. JACKSON, citizen of the United States, residing at Xenia, in the county of Greene and State of Ohio, have invented certain new and useful Improvements in Wheels, of which the following is a specification.

This invention contemplates certain new and useful improvements in vehicle wheels, and the object of the invention is an improved wheel which embodies peculiar means for reducing to a minimum the friction caused by the rotation of the wheel, and which thus reduces the power required to propel a vehicle equipped with my improved wheel.

With this and other objects in view that will more fully appear as the description proceeds, the invention consists in certain constructions and arrangements of the parts that I shall hereinafter fully describe, and then point out the novel features thereof, in the appended claim.

For a full understanding of the invention and the merits thereof, and to acquire a knowledge of the details of construction, reference is to be had to the following description and accompanying drawings, in which:

Figure 1 is a view in side elevation of my improved wheel, with one of the side members removed therefrom; Fig. 2 is a transverse section; and, Fig. 3 is a longitudinal section on the line 3—3 of Fig. 2.

Corresponding and like parts are referred to in the following description, and indicated in all the views of the drawings, by the same reference characters.

In the drawings, the numeral 1 designates a spindle to which my improved wheel is applied, and upon which is rigidly mounted a hub section 2, said hub section being formed, in the present instance, with a preferably square central opening 3 which is arranged to receive an angular portion 4 formed intermediate of the ends of the spindle, to prevent any rotation of the hub section relative to the same. The hub section is encircled by an annular rim section 5, the inner surface of which is spaced from the periphery of the hub section, as shown, a transverse series of bearing rollers 6 being interposed between the hub and rim sections to permit the free rotation of the latter about the former and practically eliminate the friction caused thereby. These bearing rollers are formed with central bores 7, and at their ends with outstanding flanges 8 which abut against the hub and rim sections to hold the latter in alinement. In order to hold the bearing rollers in proper spaced relation without interfering with the free movement thereof, I provide two annular holders 9 which extend loosely on opposite sides of the wheel in alinement with the rollers and which are formed with pairs of corresponding openings 10 arranged for alinement with the bores 7 in the respective rollers, pivot pins 11 passing through the alining openings 10 and bores 7 with their ends projecting laterally beyond the holders, said pivot pins being detachably secured in position, in the present instance, by means of split pins 12 passing through apertures in the projecting ends of the same.

In order to incase the wheel and protect it from the detrimental effects of dust or moisture or the like, two side members 14 are loosely mounted upon the spindle between pairs of spaced collars 15 rigidly secured on the spindle on opposite sides of the hub section, said sides being formed at their edges with inwardly disposed annular flanges 16 which overlap the periphery of the rim section 5 that is preferably laterally enlarged, as shown, to form an increased bearing surface. A tire 17 of metal or other suitable substance or material encircles the flanges 16 and the periphery of the rim section 5, and is riveted or otherwise similarly secured thereto, to rigidly secure the parts of the wheel together.

From the above description, in connection with the accompanying drawings, it will be apparent that I have provided a simple, durable and efficient construction of wheel, in which the load carried by the axle is supported by the bearing rollers directly beneath the hub section, in which the friction is practically eliminated by the bearing rollers interposed between the hub and rim sections, and which consists of comparatively few parts that may be easily and cheaply manufactured and readily assembled.

Preferably, openings 18 are provided at proper points in the side members 14, so that access to the rollers may be had whenever necessary.

Having thus described the invention, what I claim is:

The combination with a spindle, of a wheel of the character described, comprising a relatively stationary hub section mounted on the spindle, a rim section encircling the hub section with its inner surface in spaced relation to the periphery thereof, anti-friction bearings interposed between the hub and rim sections, pairs of spaced collars rigidly secured to the spindle on opposite sides of the hub section, side members loosely mounted upon the spindle between said spaced collars, said side members being formed at their outer edges with inwardly disposed annular flanges overlapping the periphery of the rim section, and a tire encircling said flanges and the rim section and rigidly secured to the same, as and for the purpose specified.

In testimony whereof I affix my signature in presence of two witnesses.

JOHN C. JACKSON. [L. S.]

Witnesses:
WILLIAM S. HOWARD,
CHARLES H. HOWARD.